US005461465A

United States Patent [19]

Sunaga et al.

[11] Patent Number: 5,461,465

[45] Date of Patent: Oct. 24, 1995

[54] DEVELOPING APPARATUS

[75] Inventors: Takayuki Sunaga; Akihiko Kato; Toru Ishikawa; Hideaki Miyata, all of Kanagawa, Japan

[73] Assignee: Fuji Xerox Co., Ltd., Tokyo, Japan

[21] Appl. No.: 48,231

[22] Filed: Apr. 9, 1993

[30] Foreign Application Priority Data

Apr. 10, 1992 [JP] Japan .................................... 4-116666

[51] Int. Cl.$^6$ ................................ G03B 9/36; G03B 9/58

[52] U.S. Cl. ........................... 355/245; 118/653; 355/259

[58] Field of Search .................................... 355/246, 251, 355/252, 259, 260, 261; 354/317, 318; 118/653

[56] References Cited

U.S. PATENT DOCUMENTS

| | | | |
|---|---|---|---|
| 5,057,868 | 10/1991 | Sekino et al. | 355/215 |
| 5,134,960 | 8/1992 | Shirai | 118/653 |
| 5,177,322 | 1/1993 | Nishimura et al. | 118/653 |

FOREIGN PATENT DOCUMENTS

| | | |
|---|---|---|
| 1-164456 | 11/1989 | Japan . |
| 2-43582 | 12/1990 | Japan . |
| 2-302770 | 12/1990 | Japan . |
| 3-4255 | 1/1991 | Japan . |
| 3-61971 | 3/1991 | Japan . |

*Primary Examiner*—D. Rutledge
*Attorney, Agent, or Firm*—Finnegan, Henderson, Farabow, Garrett & Dunner

[57] ABSTRACT

A developing apparatus is disclosed, comprising a cylindrical developer support member which is provided facing an electrostatic latent image support member and transports developer attached to the surface, a developer controlling member which contacts the round surface of the developer support member under pressure to control the quantity of developer thereon, forming a thin layer of developer, and side seal members which contact the round surface of end portions of the developer support member and face the end portions of the developer controlling member along the axis of the developer support member to prevent leakage of developer, and whose side seal members do not contact the developer controlling member or contact it under a pressure which does not constrain the displacement of the developer controlling member.

4 Claims, 6 Drawing Sheets

DEVELOPING APPARATUS

FIELD OF THE INVENTION

This invention relates to a developing apparatus which develops a latent image formed by a static electrical charge pattern by attaching a developer, and especially a single-component powder developer to the image.

BACKGROUND OF THE INVENTION

As one developing apparatus using a single-component developer is known an apparatus in which a thin layer of developer is formed on a developer support member disposed facing a support member for an electrostatic latent image, and the latent image is developed by transferring developer from the developer support member to the electrostatic image in the developing area where the developer support member faces the latent image support member.

In such a developing apparatus, the developer stored in a housing is supplied to the surface of the developer support member and then transported by the rotation of the surface. The developer support member has an opening in the housing toward the electrostatic latent image support member, and it comes into proximity with the electrostatic latent image support member at this point.

In this kind of apparatus, if developer leaks from the margins of the image area along the axis of the developer support member or through the space between the developer support member and the housing, it splashes outside the developing apparatus, causing problems such as making other portions of the image forming apparatus dirty. To prevent this, for example, Japanese unexamined utility model publication Hei 1-164456 (1989), Japanese unexamined patent publication Hei 2-43582 (1990), Japanese unexamined patent publication Hei 2-302770 (1990), Japanese unexamined patent publication Hei 3-4255 (1991) and Japanese unexamined patent publication Hei 3-61971 describe developing apparatuses having side seal members at both ends along the axis of the developer support member to prevent the leakage. All these developing apparatuses use a porous elastomer, a felt type material or the like as side seal members and fill the spaces between the developer support member and the housing with them to prevent leakage.

One such developing apparatus has the above described side seal members and a blade contacting the developer support member under pressure and used as a developer controlling means for controlling the quantity of developer on the developer support member and forming a thin layer of developer.

FIG. 6 illustrates an example of such a developing apparatus. In it, (a) is a cross-sectional view orthogonal to the axis of the developer support member and (b) is a longitudinal-sectional view along the axis of the developer support member.

In this developing apparatus, a developer support member 101, a blade 102 which contacts it under pressure, a mixing and transporting member 105 which provides developer to the surface of the developer support member by rotating in the developer storage compartment are provided in housing 104. Developer is transferred from one end portion along the axis of the developer support member through a developer transport chamber 109.

In this developing apparatus, as shown in FIG. 7(*a*) and (*b*), side seal members 103 are provided so that they contact the round surface of the developer support member 101 under pressure and are pressed to match both ends of blade 102. By applying side seal members between inside of the housing 104 and the developer support member, leakage of developer from around both end portions of the developer support member is prevented. If the pressing force of the side seal members 103 toward the end portions of the blade 102 is small, a space may be formed between them by the distortion (contraction) of the side seal members 103 or errors in positioning, which may lead to a leakage of developer. To prevent this, side seal members 103 are brought into contact with the blade 102 under sufficient pressure to provide some distortion.

Forming side seal members 103 to match both end portions of the blade 102 makes them easy to fit and facilitates the production process.

The side seal members 103 have, in many cases, a felt material 103*a* made from wool, tetron or nylon, and a sliding material 103*b* contacting the developer support member made of a felt of fluorine-based resin. As side seal members made of wool tend to distort significantly in repeated use, causing a space between the developer support member as shown in FIG. 7(*c*), which may lead to leakage of developer, sometimes polyurethane foam is used instead.

A developing apparatus having side seal members pressed to match both end portions of the blade, which is a developer controlling member, however, has the following problems.

Usually, in addition to the force pressing the side seal members to the developer support member and the frictional force between the side seal members and the round surface of the developer support member, the side seal members are also subject to a pressing force toward the blade. If the pressing force of the side seal members 103 toward the end portions of the blade 102 is strong, a flat spring 102*a* of the blade distorts as shown in FIG. 8(*a*), and the contact pressure of the elastomer 102*b* toward the developer support member 101 is not uniform. With such non-uniformity of contact pressure, non-uniformity in the thin layer of developer formed on the developer support member 101 occurs, resulting in a striped non-uniform image density.

If over time, wear occurs in the elastomer 102*b* of the blade sliding on the surface of the developer support member 101, and if the contact force of the side seal members 103 to match the blade 102 is strong, displacement of the blade 102 is constrained, resulting in an inadequate and unstable contact force of the blade toward the surface of the developer support member 101 as shown in FIG. 8(*b*). This leads to failures in the formation of the layer of developer around the developer support member and to defects in images.

Developing apparatus having these problems must be replaced even if there are no problems in other portions and functions, which may shorten the life of the developing apparatus.

SUMMARY OF THE INVENTION

It is an object of the present invention to provide a developing apparatus free of the defects found in the conventional art.

it is another object of the present invention to provide a developing apparatus which prevents failures in the formation of the layer of developer on the developer support member by the side seal members being brought into forcible contact with the end portions of the blade which is a developer controlling member.

It is a further object of the present invention to provide a developing apparatus free of leakage of developer and having a long life.

Additional objects and advantages of the invention will be set forth in part in the description which follows and in part will be apparent to a person with ordinary skill in the art from the description, or may be learned by practice of the invention.

BRIEF DESCRIPTION OF THE DRAWING

The manner by which the above objects and other objects, features and advantages of the present invention are attained will be fully evident from the following detailed description when it is considered in light of the accompanying drawings, wherein.

DETAILED DESCRIPTION OF THE INVENTION

Figure 1A:
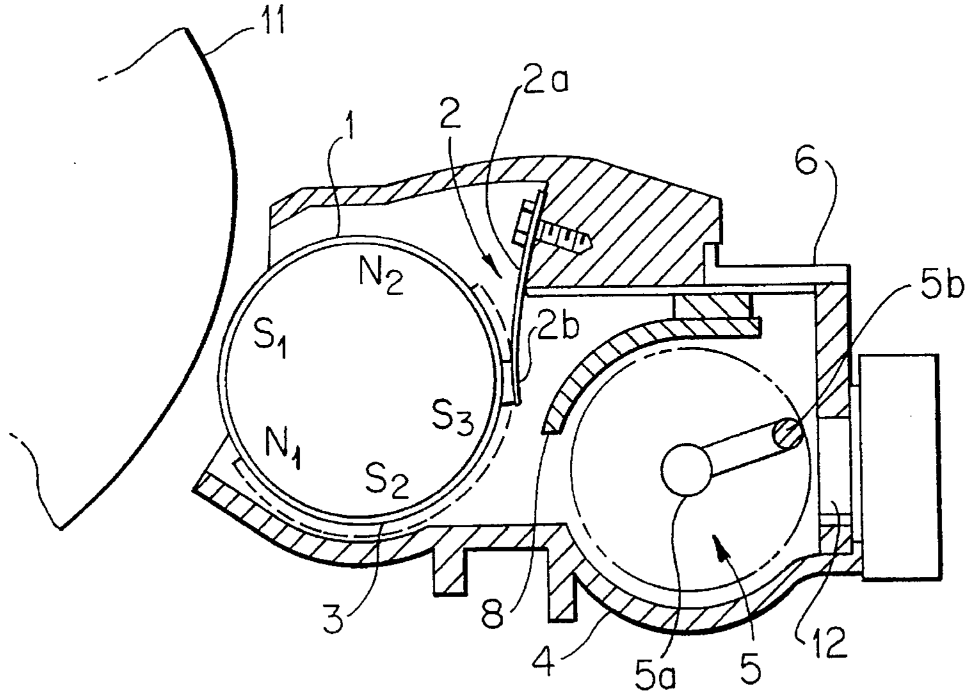
FIGS. 1(i a) and 1(*b*) are schematic cross-sectional views of a first embodiment of the developing apparatus according to the present invention.

To solve above described problems, the developing apparatus of the present invention comprises a cylindrical developer support member which is provided facing the electrostatic latent image support member and transports developer attached to the surface, a developer controlling member which contacts the round surface of the developer support member under pressure to control the quantity of developer thereon, forming a thin layer of developer, and side seal members which contact the round surface of end portions of the developer support member and face end portions of the developer controlling member along the axis of the developer support member to prevent leakage of developer, and the developer controlling member contacts the developer support member under pressure in the position where the surface of the developer support member is substantially vertical. In it, the side seal members do not contact the developer controlling member or contact it under a pressure which does not constrain the displacement of the developer controlling member.

The developing apparatus of the present invention also comprises a developer storage compartment provided along the axis of and neighboring the developer support member and a partition restricting the passage through which the developer is supplied to the developer support member and provided between the developer storage compartment and the developer support member.

The developing apparatus of the present invention has side seal members comprising the laminated sliding and base materials and having cutaway portions matching the round surface of the developer support member and provided in the area where the base material faces the end portion of the developer controlling member, and in which the areas neighboring the cutaway portions contact the developer controlling member.

By a pressure which does not constrain the displacement of the developer controlling member is meant a force which does not constrain the displacement of the developer controlling member in the direction substantially orthogonal to the surface of the developer support member and does not affect the contact force of the developer controlling member toward the surface of the developer support member.

The partition restricting the passage through which the developer passes can be a wall supported by an upper portion of the housing of the developing apparatus and projecting downward. In this case, the space between the tip of the partition and the lower portion of the housing is the passage through which the developer passes. The position of the tip of the partition, that is the size of the passage, can be varied appropriately along the axis of the developer support member. In addition to the wall supported by the upper portion of the housing, there may also be a wall fixed to the lower portion of the housing or one having a plurality of apertures as passages for the developer.

The shape of the cutaway portions of the base material of the side seal members in the developing apparatus can be rectangular, triangular or the like, and a shape which reduces the rigidity in the contact area of the side seal members with the end portion of the developer controlling member can be chosen.

As the developer controlling member does not contact the side seal members or they contact each other under a low pressure, displacement of the developer controlling member is not constrained by the side seal members nor is it distorted by the pressing force from the side seal members, which allows the stable formation of a uniform thin layer of developer on the developer support member for a long time.

As the developer controlling member contacts the developer support member under pressure where the surface of the developer support member is substantially vertical, the developer controlled by the developer controlling member does not accumulate around the contact area, and the developer is kept from the surface of the developer support member by gravity. Therefore, even if the developer controlling member does not contact the side seal member or they contact each other under a low pressure, there is almost no leakage of developer through the space between them.

Further, the range where the side seal members are applied is reduced because the developer controlling member contacts the developer support member in an upstream position in the direction of rotation of the developer support member, and accumulated developer does not attach to the developer support member downstream of the contact area, so that the quantity of material required for making the side seal members is reduced, the friction between the developer support member and the side seal members is reduced, and the driving torque and the temperature rise caused by frictional heat decrease.

The developer controlling member does not contact the side seal members or they contact each other under a low pressure, and no defects occur when the developer controlling member is pressed against the side seal members. In the developing apparatus of the present invention, there is a partition between the developer storage compartment and the developer support member, and the size of the passage through which the developer is supplied to the developer support member from the developer storage compartments can be varied appropriately, which allows the distribution of the developer along the axis of the developer support member to be controlled, and excessive accumulation of developer at both ends along the axis of the developer support member can be prevented. Therefore, even if there is a space between the developer controlling member and the side seal members contacting it under pressure at both ends of the developer support member, there is almost no leakage of developer through it.

The developer controlling means contacts the developer support member where the surface of the developer support member is substantially vertical, and there is a partition between the developer storage compartment and the developer support member, so even if there is a space between the developer controlling member and the side seal members, the leakage of developer is prevented effectively.

The side seal members have cutaway portions in the area where the base material of the side seal members contacts a tip of the developer controlling member, and as the rigidity of the area neighboring the cutaway portions is low, even if the displacement of the base material caused by contacting the developer controlling member is large, the contact pressure is kept low. Therefore, the leakage of developer is prevented effectively without constraining the displacement of the developer controlling member.

EMBODIMENT

The invention is now described in terms of an embodiment, and with reference to the Figures.

Figure 1B:
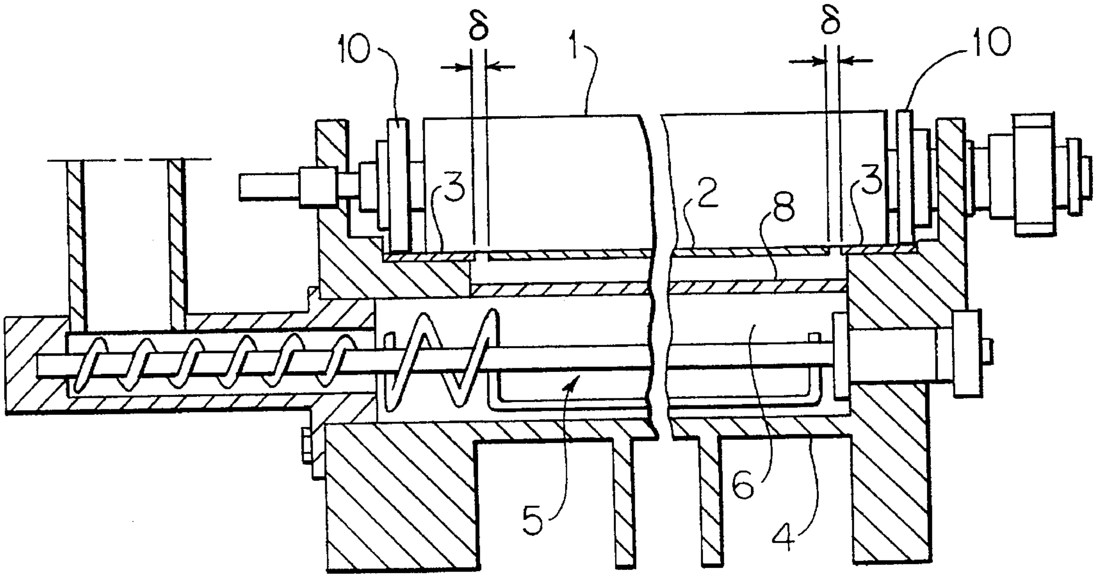
Figure 2:
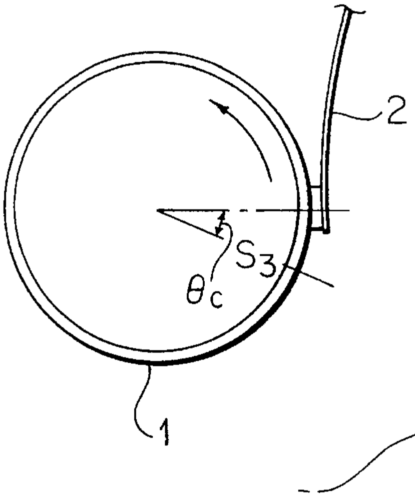
FIG. 2 illustrates the relation between the position where the developer controlling member contacts the developer support member and the position of the trimming magnet in the first embodiment of the developing apparatus.
Figure 6A:
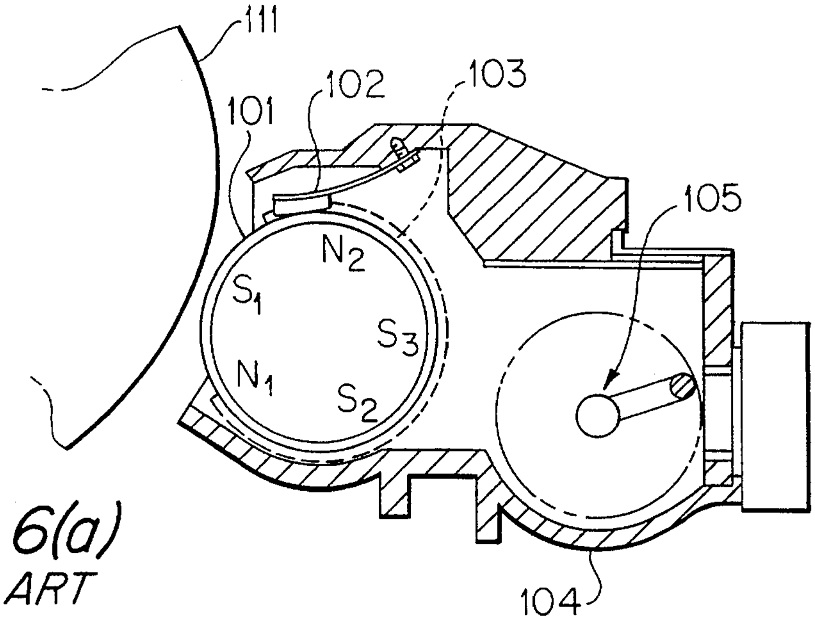
FIG. 6(a) PRIOR ART
FIGS. 6(*a*) and 6(*b*) are a schematic cross-sectional view illustrating the structure of a conventional developing apparatus.
Figure 6B:
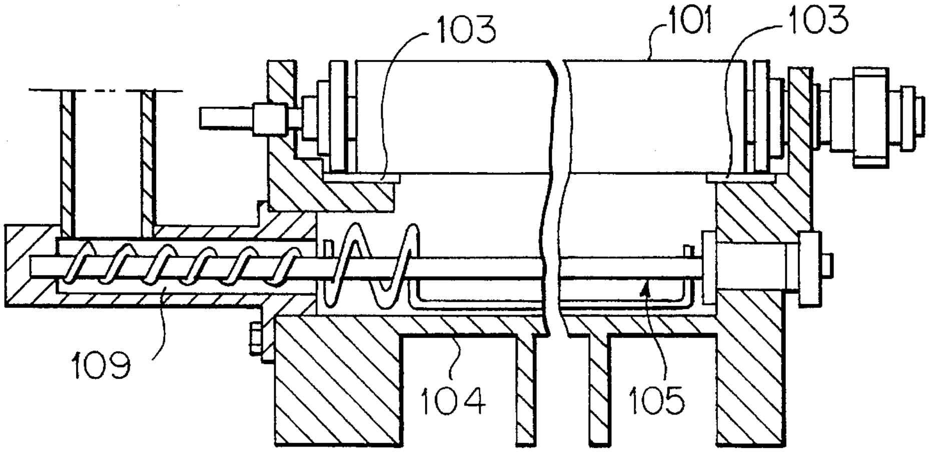
FIG. 6(b) PRIOR ART

FIG. 1 illustrates a schematic cross-sectional view of an embodiment of a developing apparatus according to the present invention.

The developing apparatus has a housing 4 which holds developer and encloses a cylindrical developer support member 1 which transports developer by attracting it to the surface and rotating, a developer controlling member 2 which controls the quantity of developer attached to the surface of the developer support member 1 and a mixing and transporting member 5 which mixes and transports developer and supplies it to the developer support member 1 by rotating. There is a partition 8 supported by the upper portion of the housing in the area between the developer support member 1 and the mixing and transporting member 5.

The developer support member 1 has a magnet core fixed so as not to rotate and a sleeve supported rotatably around it. The magnet core includes magnets, and magnetic developer is attracted to the surface of the sleeve by the magnetic field formed between neighboring magnets and is transported by the rotation of the sleeve.

The developer controlling member 2 comprises a flat spring **2*a* and a soft elastomer 2*b*, and an end portion of the flat spring 2*a* is fixedly supported by housing 4, and the elastomer 2*b* applied near the other end portion of the flat spring contacts the round surface of the developer support member under pressure, which controls the quantity of developer attached to the surface of the developer support member 1 and allows the formation of a thin layer of developer. The position where the developer controlling member 2 contacts the developer support member 1 is downstream in the direction of rotation from where the developer is supplied to the surface of the developer support member 1**, and it is arranged to be where the surface of the cylindrical developer support member is substantially vertical.

The developer controlling member 2 has a uniform cross-section along the axis of the developer support member, and it contacts the round surface of the developer support member 1 under uniform pressure. The contact area is shorter than the whole length of the developer support member, and the side seal members 3 contact the round surface of the end portions of the developer support member 1. The side seal members 3 comprise a base material of urethane foam and a sliding material made with felt of fluorine-based resin applied to the base material, and the felt of a fluorine-based resin contacts the surface of the developer support member 1. The side seal members 3 are supported so as to be separated from the end portions of the developer controlling member 2 by a very small spacing $\delta$ and so as not to contact it. The area where the side seal members 3 are applied along the round surface of the developer support member is from around the entrance of the housing downstream in the direction of rotation of the developing area to the area just above where the developer controlling member 2 contacts the developer support member 1.

The mixing and transporting member 5 is provided to go through the developer storage compartment 6 and the developer transport chamber 9 connecting to the developer storage compartment 6, and it comprises a rotatable bar member **5*a* and a transporting member 5*b* which rotates with the bar member 5*a***.

The partition 8 is provided projecting from the upper portion of the housing along the axis of the developer support member 1 to partition the areas where the developer storage compartment 6 and the developer support member 1 are provided. The height of the tip of the partition 8 is varied along the axis of the developer support member 1 and it restricts the passage through which the developer is supplied from the developer storage compartment 6 to the developer support member 1 by determining the space between it and the lower portion of the housing.

The symbols 10 in the Figure indicate tracking rollers to maintain the spacing between the developer support member 1 and the electrostatic latent image support member 11.

In such a developing apparatus, the supply of developer is controlled by a sensor 12 provided in the developer storage compartment 6, and if an appropriate quantity of developer is supplied from the developer transport chamber 9 connected to an end portion of the developer storage compartment, developer is supplied along the axis of the developer support member by the mixing and transporting member 5 and then is supplied to the developer support member 1. At this time, as the passage from the developer storage compartment 6 to the developer support member 1 is partitioned by the partition 8, only the appropriate quantity of developer is supplied progressively and uniformly around the round surface along the axis of the developer support member 1. Therefore, excessive developer does not go around the end portions along the axis of the developer support member and accumulate.

The developer supplied around the developer support member attaches to the surface of the developer support member 1 and is transported by the rotation of the sleeve. The quantity of developer attached to the surface of the developer support member is controlled in the area where the developer controlling member 2 contacts the developer support member, and thus a thin layer of developer is formed. The thin layer of developer formed on the developer support member is transported to the developing area facing the electrostatic latent image support member 11 by the rotation of the sleeve and forms an image by attaching to the electrostatic latent image on the electrostatic latent image support member. On the other hand, excessive developer in the contact area of the developer controlling member 2 and the developer support member is removed from the surface of the developer support member 1 and is returned to the pile of developer somewhat downstream from the contact area. At this time, as the developer controlling member 2 contacts the developer support member where the surface of the developer support member 1 is substantially vertical, removed developer does not accumulate on the rear side of the developer controlling member 2 or around the contact position of the developer support member, and even if there is a space between the developer controlling member 2 and the side seal members 3, there is almost no leakage of developer.

The transport of developer around the contact position of the developer controlling member 2 and the developer support member 1 is influenced by the position of the magnets of the magnetic core contained in the developer support member 1. Further, the quantity of developer transported, and the degree of charging of the developer transported on the developer support member as a thin layer is influenced by the relation between the contact position of the developer controlling means 2 and the position of the magnets.

Table 1 shows flow characteristics of developer around the developing controlling member and the state of the thin layer of developer formed on the developer support member when the developer controlling means 2 contacts the developer support member in the position where the surface of the developer support member 1 is vertical, when the position of the trimming magnet in the developer support member (pole $S_3$ in FIG. 1) is varied. It is preferable that the developer around the developer controlling member is replaced soon to some extent and sufficient quantity of developer for developing an image of high density is required. Here, the position of the trimming magnet is shown by the angle θc from the contact position of the developer controlling member 2 to an upstream position in the direction of rotation of the developer support member 1.

Figure 3:
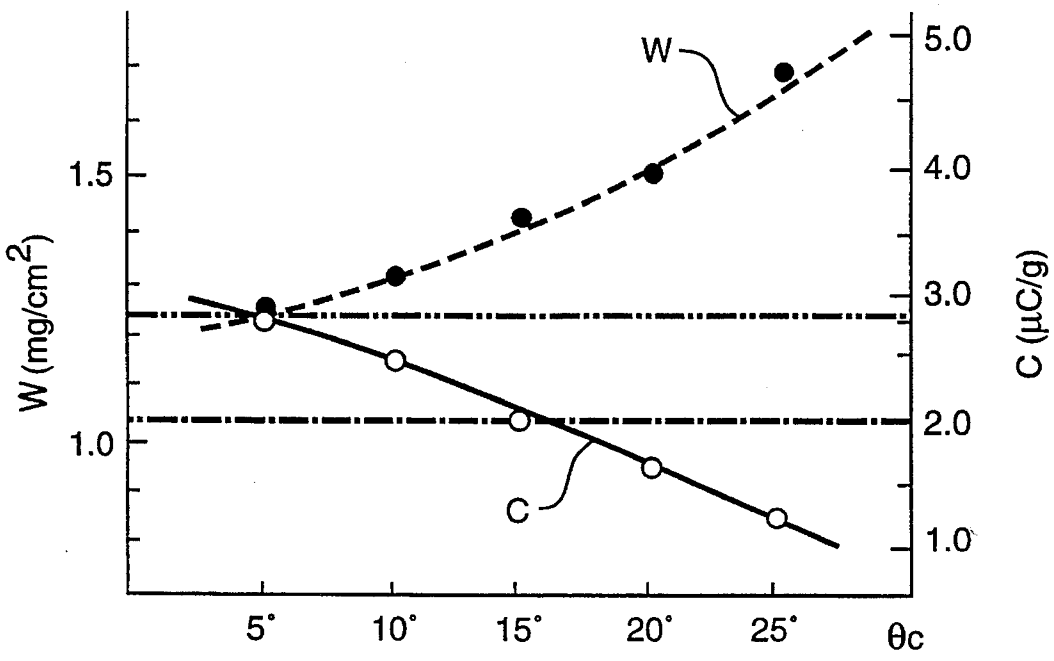
FIG. 3 illustrates the relation between the position of the trimming magnet, the quantity W of developer forming the thin layer and transported on the developer support member and the amount of charge C applied to the developer.

FIG. 3 shows the change of quantity W of developer formed into the thin layer on the developer support member and transported, and the degree of charge C of developer as the position of the trimming magnet is varied.

FIG. 3 and Table 1 show that the quantity W of toner transported and the degree of charge C are in the allowable range when the angle θc between the contact position of the developer controlling member and the position of the trimming magnet is not more than 15°, and they also show that the flow characteristics of developer around the developer controlling member are optimal in the range from 5° to 15°.

Figure 4A:
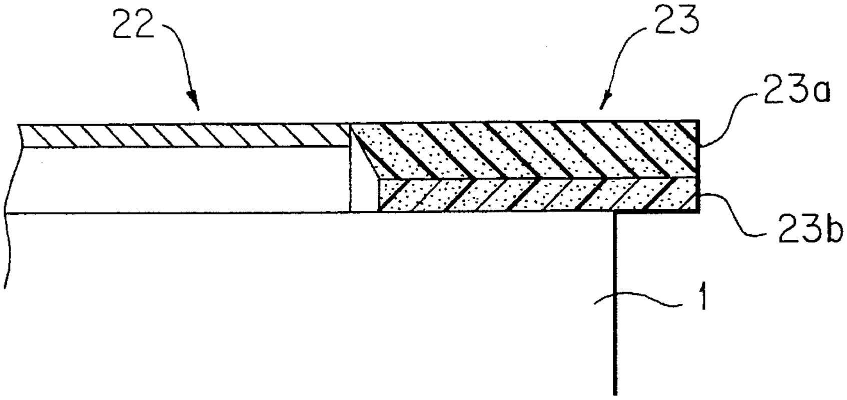
FIGS. 4(*a*), 4(*b*), and 4(*c*) are schematic cross-sectional views of side seal members usable in the embodiment of the developing apparatus according to the present invention.
Figure 4B:
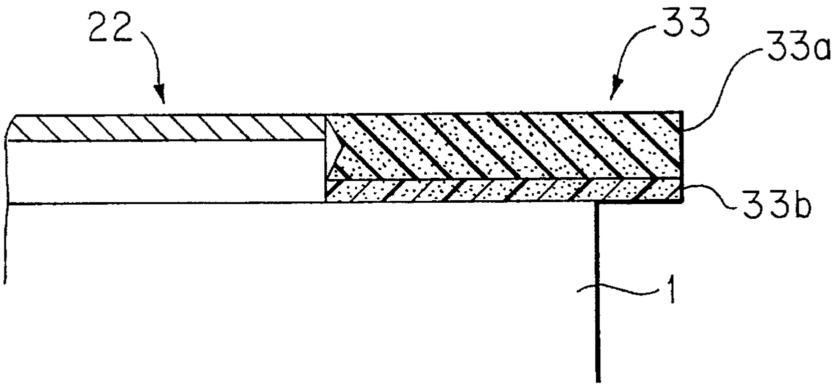
Figure 4C:
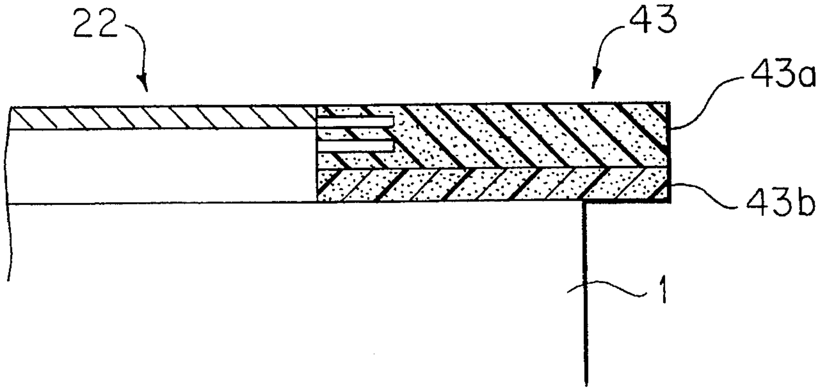
Figure 7A:
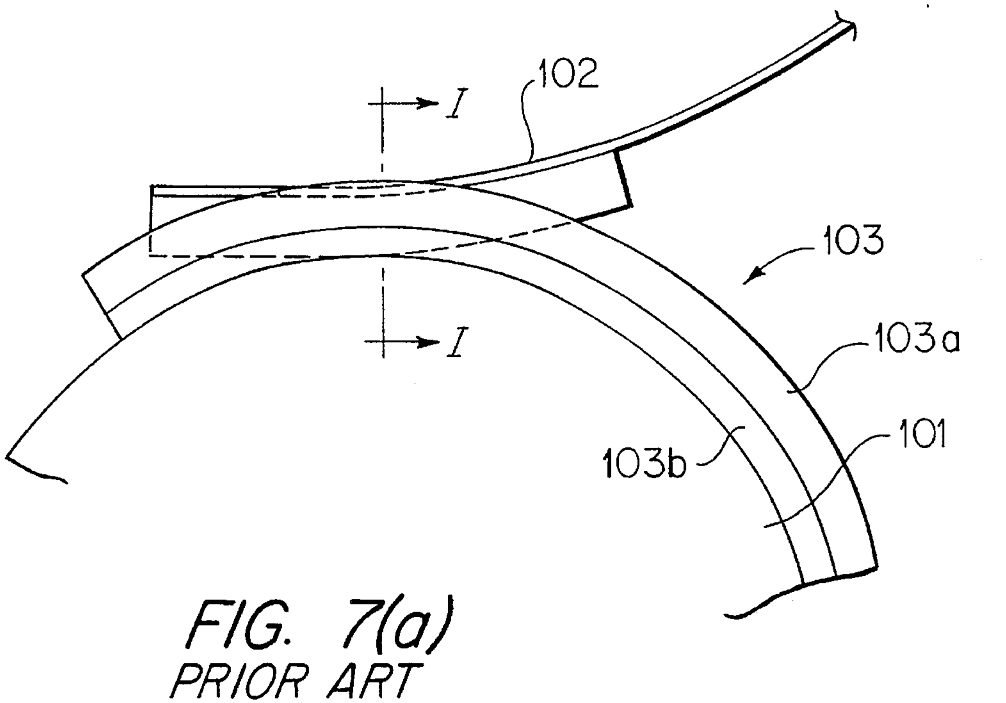
FIG. 7(a) PRIOR ART
FIG. 7(*a*), 7(*b*), and 7(*c*) illustrate the structure around the end portions along the axis of the developer support member of the conventional developing apparatus.
Figure 7B:
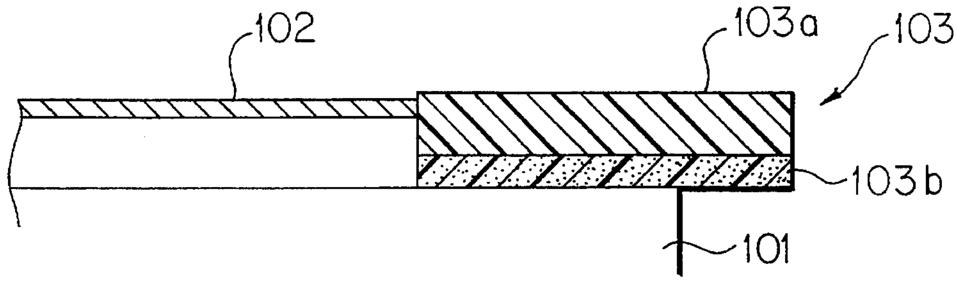
FIG. 7(b) PRIOR ART
Figure 7C:
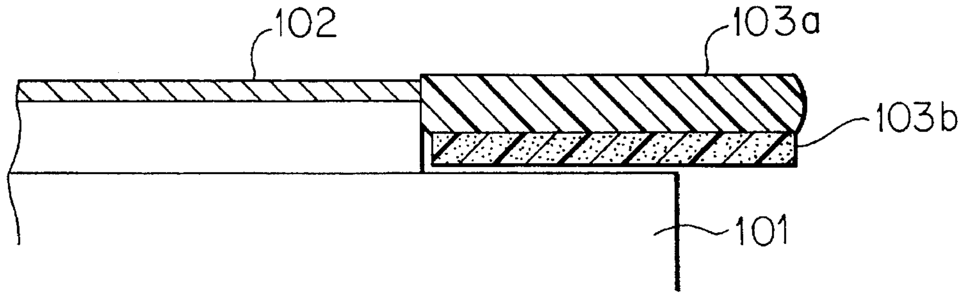
FIG. 7(c) PRIOR ART
Figure 8A:
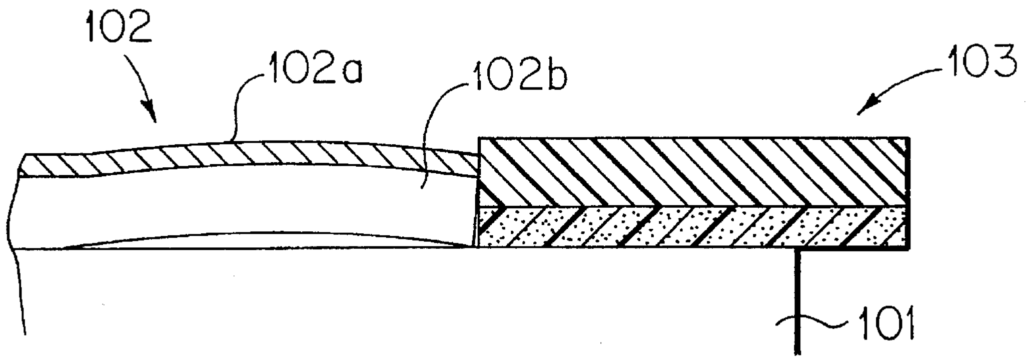
FIG. 8(a) PRIOR ART
FIG. 8(*a*) and 8(*b*) show the problems in the conventional developing apparatus.
Figure 8B:
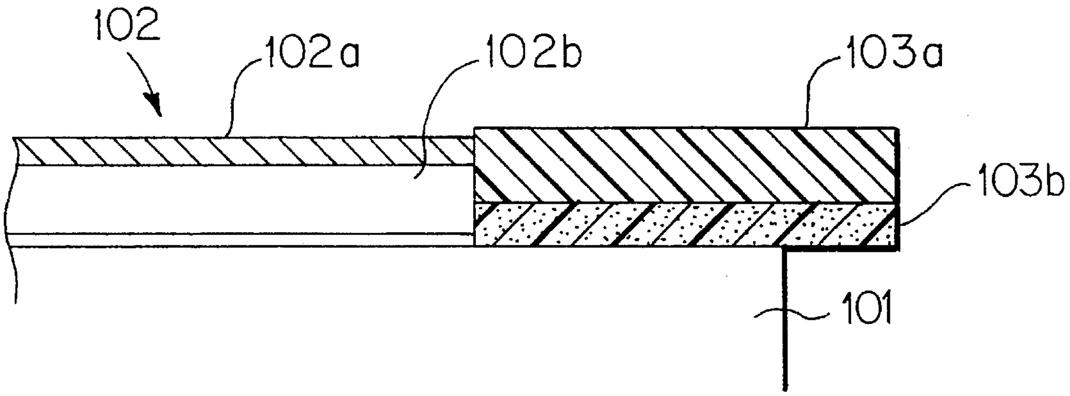
FIG. 8(b) PRIOR ART

FIG. 4 is a cross-sectional view of an embodiment of the side seal members used in the developing apparatus of the present invention. Such side seal members can be used when high sealing quality is required for using a non-magnetic single-component developer in a high speed copying machine or the like.

Each of the side seal members shown in (a), (b) and (c) of FIG. 4 is pressed against the developer support member 1 with its end portion contacting a tip of the developer controlling member 22, and the end portion facing the developer controlling member 22 has rectangular or triangular cutaway portions 23*c*, 33*c* and 43*c* in a cross-sectional view including the axis of the developer support member.

Such cutaway portions around the edge portion reduce the rigidity around the contact areas 23*a*, 33*a* and 43*a* of the developer controlling member 22 and the base materials 23*a*, 33*a* and 43*a*, and there is thus a tendency to distort. Therefore, even if the distortion of the base material 23*a*, 33*a* and 43*a* and the sliding materials 23*b*, 33*b* and 43*b* is large when contacting the developer holding member 22, since the contact force of the side seal members against the end portions of developer controlling member is kept small, this allows an improvement of the sealing quality of the developer without distorting or constraining developer controlling member 22.

The side seal members used in the developing apparatus of the above described embodiment comprise polyurethane foam instead of conventionally used wool felt or the like as a base material and a felt of fluorine-based resin applied to it. Side seal members of polyurethane foam allow the decrease of permanent set-in fatigue, which is a long-term and unrecoverable distortion of the base material. The following other effects are also obtained by using polyurethane foam.

Figure 5:
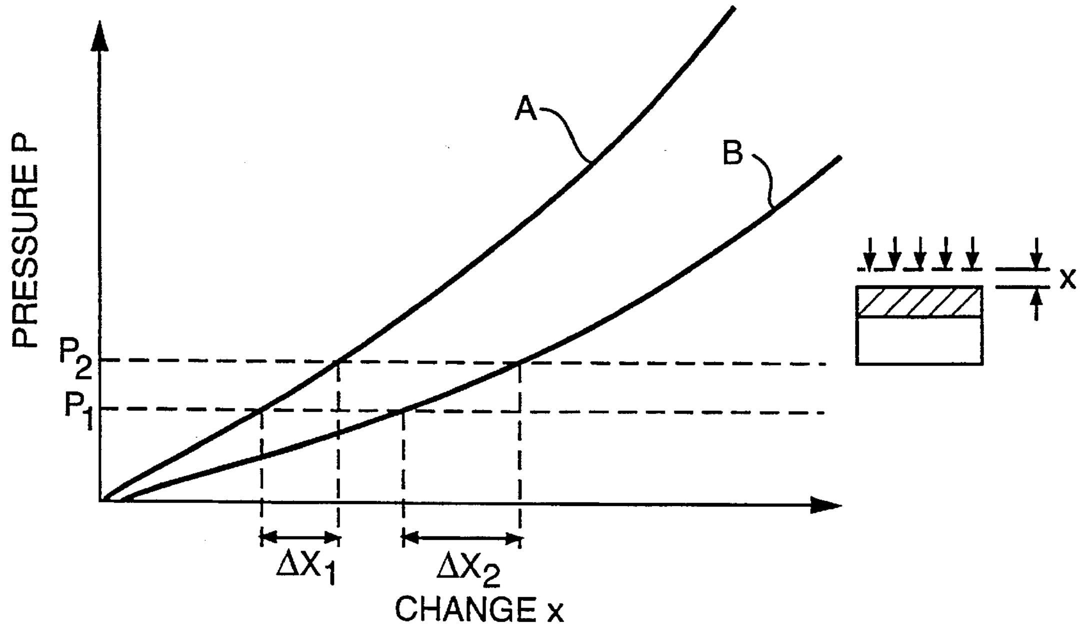
FIG. 5 illustrates the relation between the force which the side seal members receive from the developer support member and the change in the thickness of the side seal members.

First, a base material of polyurethane foam relaxes the size tolerance and the accuracy of application. FIG. 5 shows the pressure P which the side seal members receive from the sleeve when pressed against the developer support member and the change X in side seal member thickness. Curve A is for side seal members having a wool felt as a base material,

TABLE 1

| | θc | ≧15° | 5°–15° | 0°–5° | ≦0° |
|---|---|---|---|---|---|
| Replacement of developer | Speed | Slow | Quick | Quick | Too quick |
| | Quantity | Much | Much | Little | Too little |
| | Assessment | Fair | Good | Poor | Very poor |
| Flow characteristics of the developer support member | Layer uniformity of thickness | Uniform | Uniform | Some non-uniformity | non-uniform |
| | Quantity | Low | Appropriate | Somewhat high | High |
| | Assessment | Fair | Good | Fair | Poor |

and curve B is for those having polyurethane foam as a base material. When the side seal members receive a pressure from the surface of the developer support member in the range from $P_1$ to $P_2$, they distort to form a seal with the developer support member and prevent the leakage of developer, the side seal members using polyurethane foam have a larger variation of side seal member thickness than those using wool felt, for the same pressure received from the sleeve. Further, when the pressure received from the sleeve is in the range from $P_1$ to $P_2$, the width of change is $\Delta X_1$ for the side seal members using wool felt and $\Delta X_2$ for those using polyurethane foam. Therefore, with side seal members using polyurethane foam, even if the thickness of side seal members varies greatly in the range of $\Delta X_2$, the pressure received from the sleeve can be kept in the range from $P_1$ to $P_2$, which results in a greater tolerance for the side seal member thickness and reduced accuracy required in installation.

Second, polyurethane foam used as a base material improves the sealing quality of developer between the side seal members and the surface of the developer support member.

The side seal members must be bent in an arc along the round surface of the developer support member, and a base material made of wool felt or the like tends to cause wrinkles in the sliding material made of fluorine-based felt, because distortion of wool felt or the like tends to be uneven because of inadequate care in installation. If polyurethane foam is used, distortion tends to be uniform, which results in extremely few wrinkles in the sliding material. Therefore, very small spaces between the side seal members and the surface of the developer support member tend not to be formed, and durability, sealing quality and productivity of the side seal members are improved.

What is claimed is:

1. A developing apparatus having a cylindrical developer support member which is provided facing an electrostatic latent image support member to transport thereto developer attached to a round surface of the developer support member, a developer controlling member which contacts the round surface of the developer support member under pressure to control the quantity of developer thereon, and thereby forming a thin layer of developer thereon, and side seal members which contact the round surface of end portions of the developer support member and face end portions of the developer controlling member along an axis of the developer support member to prevent leakage of developer, wherein:

said side seal members have no contact with the developer controlling member thereby avoiding pressure contact which would otherwise constrain displacement of the developer controlling member;

said developer controlling member contacting the developer support member at a contact position selected in an area where the round surface of the developer support member is substantially vertical with developer attached to the round surface of the developer support member being transported upwardly to the developer controlling member; and a trimming magnet, provided inside the developer support member and located lower than the contact position to attract developer supplied to the round surface of the developer support member.

2. The developing apparatus of claim 1 having a developer storage compartment spaced from and provided along the axis of the developer support member and a partition restricting a passage through which the developer is supplied to the developer support member and provided between the developer storage compartment and the developer support member.

3. A developing apparatus having a cylindrical developer support member which is provided facing an electrostatic latent image support member to transport thereto developer attached to a round surface of the developer support member, a developer controlling member which contacts the round surface of the developer support member under pressure to control the quantity of developer thereon and thereby forming a thin layer of developer thereon, and side seal members which contact the round surface of end portions of the developer support member and face end portions of the developer controlling member along an axis of the developer support member to prevent leakage of developer, wherein;

said side seal members each comprise a base material sheet and a sliding material sheet laminated to the base material sheet; and said base material sheet has a cutaway portion elongated along a circumferential direction of the round surface of the end portion of the developer support member and provided in an end surface of said base material sheet which end surface faces the developer control member; and said base material sheet further has one or more areas neighboring on the cutaway portion and contacting the developer controlling member.

4. A developing apparatus having a cylindrical developer support member which is provided facing an electrostatic latent image support member to transport thereto developer attached to a round surface of the developer support member, a developer controlling member which contacts the round surface of the developer support member under pressure to control the quantity of developer thereon, forming a thin layer of developer, side seal members which contact the round surface of end portions of the developer support member and face end portions of the developer controlling member along an axis of the developer support member to prevent leakage of developer, and a trimming magnet provided inside the developer support member which attracts developer supplied to the round surface of the developer support member, wherein an angle $\theta c$ at an axis between a magnetic pole of the trimming magnet and a position where the surface of the developer support member is substantially vertical is in the range from 5° to 15°.

* * * * *